(12) United States Patent
Pattok et al.

(10) Patent No.: US 7,815,010 B2
(45) Date of Patent: Oct. 19, 2010

(54) GEAR MECHANISM INCORPORATING A SIGNAL TRANSMISSION MEDIUM

(75) Inventors: Eric D. Pattok, Frankenmuth, MI (US); Rolf E. Kleinau, Bay City, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 133 days.

(21) Appl. No.: 11/894,396

(22) Filed: Aug. 21, 2007

(65) Prior Publication Data

US 2008/0078607 A1    Apr. 3, 2008

Related U.S. Application Data

(60) Provisional application No. 60/847,801, filed on Sep. 28, 2006.

(51) Int. Cl.
*B62D 5/04* (2006.01)
(52) U.S. Cl. ...................................... 180/444; 180/443
(58) Field of Classification Search ................. 180/444, 180/443
See application file for complete search history.

(56) References Cited

U.S. PATENT DOCUMENTS

| | | | | |
|---|---|---|---|---|
| 6,041,885 | A * | 3/2000 | Watanabe et al. | 180/444 |
| 2002/0047379 | A1 * | 4/2002 | Torii et al. | 310/89 |
| 2003/0136604 | A1 * | 7/2003 | Yamanaka et al. | 180/444 |
| 2006/0108884 | A1 * | 5/2006 | Shiino et al. | 310/89 |

FOREIGN PATENT DOCUMENTS

JP    08136365    5/1996

\* cited by examiner

*Primary Examiner*—Lesley Morris
*Assistant Examiner*—Tashiana Adams
(74) *Attorney, Agent, or Firm*—Cantor Colburn LLP

(57) ABSTRACT

A gear mechanism usable in an electric power steering system is provided. The gear mechanism includes a gear housing including a passage formed therein, a gear positioned in the passage, and a signal transmission medium positioned in the passage adjacent the gear. A partition is inserted into the passage to prevent contact between the signal transmission medium and the gear.

24 Claims, 5 Drawing Sheets

GEAR MECHANISM INCORPORATING A SIGNAL TRANSMISSION MEDIUM

CROSS-REFERENCE TO RELATED APPLICATIONS

This application claims the benefit of U.S. Provisional Application Ser. No. 60/847,801 filed on Sep. 28, 2006.

BACKGROUND OF THE INVENTION

The present invention relates generally to electric power steering (EPS) systems and, more particularly, to a structure for facilitating the routing of wires and other signal transmission media used for conveying control signals to sensor and motor elements incorporated into an electric power steering (EPS) system.

There is a need to measure both the torque and the angular positions of portions of a steering shaft assembly in automotive vehicles utilizing an EPS system. Generally, the steering shaft assembly is formed from an input shaft and an output shaft coupled to the input shaft. The input and output shafts may be coupled by a torsion bar engaging both of the shafts. The input shaft is also connected to a steering wheel of the vehicle, and the output shaft is connected to a steering mechanism which turns the vehicle road wheels to provide a desired steer angle of the vehicle based on the degree of rotation of the input shaft by a driver of the vehicle.

Generally, in order to determine the degree of electromechanical assist needed to turn the road wheels of the vehicle, it is necessary to calculate the torque applied by a driver of the vehicle when the driver turns a steering wheel to rotate the input shaft. The torsion bar allows the input shaft to rotate with respect to the output shaft by a predetermined amount, and a torque sensor assembly senses the relative rotational movement between the input shaft and the output shaft. The torque sensor assembly sends a signal to an electronic control unit (ECU), which then sends a control signal to a motor, initiating operation of the motor. The motor powers a gear assembly coupled to the steering mechanism. This gear assembly provides assistance in turning the vehicle road wheels.

To protect the torque sensor system from exposure to the dirt, grease, heat, and moisture encountered under the hood of the vehicle while providing proximity to the steering shaft assembly, the torque sensor assembly may be enclosed inside a housing which contains the steering shaft assembly. In addition, a signal transmission medium is provided for conveying a signal from the torque sensor assembly to the ECU. Based on this signal, the ECU generates a control signal to the motor controlling the gear assembly coupled to the steering mechanism. The signal transmission medium must be routed from the torque sensor assembly to the ECU. In previous designs, sealed electrical connectors were used to pass the signal medium from the torque sensor assembly in the interior of the shaft assembly housing to an exterior of the housing, and from the exterior of the ECU housing through to the interior of the ECU housing, for connection to the ECU. However, the use of sealed connectors in routing the signal medium to the exteriors of the housings increases the labor and material costs of the EPS assembly.

SUMMARY OF THE INVENTION

In accordance with one aspect of the present invention, a gear mechanism is provided including a gear housing including a passage formed therein, a gear positioned in the passage, and a signal transmission medium positioned in the passage adjacent the gear. A partition is inserted into the passage to prevent contact between the signal transmission medium and the gear.

In another aspect of the present invention, a gear housing is provided including a passage adapted for receiving therein a gear, a signal transmission medium positioned in the passage adjacent the gear, and a partition inserted into the passage to prevent contact between the signal transmission medium and the gear.

DETAILED DESCRIPTION

Figure 1:
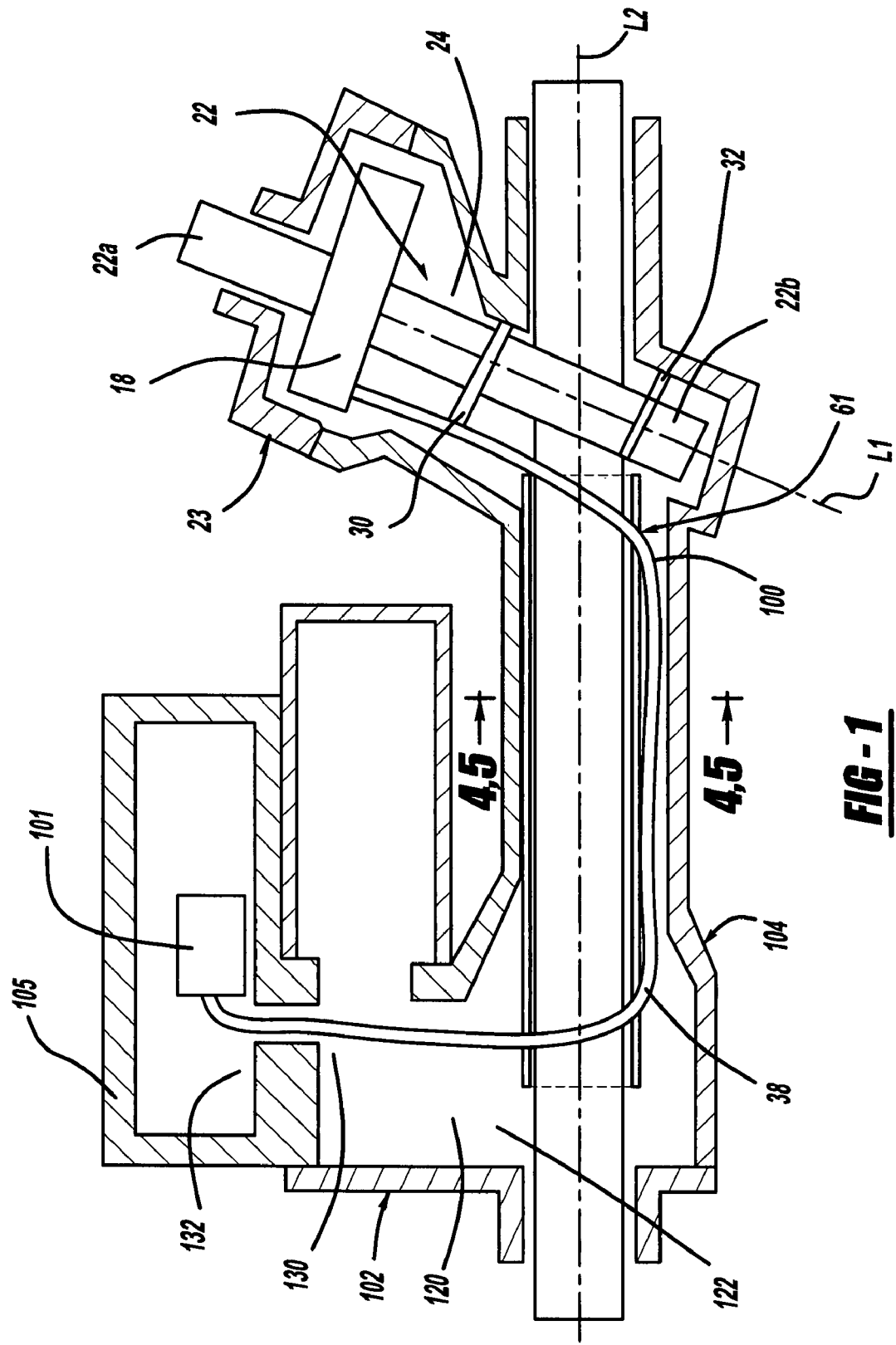
FIG. 1 is a schematic representation of a gear mechanism in accordance with various embodiments of the present invention.

FIG. 1 shows a portion of a gear mechanism in accordance with the present invention. Generally, the gear mechanism includes a gear housing having a passage formed therein, and a gear (not shown) positioned in the passage. A signal transmission medium 100 (for example, one or more wires) is positioned in the passage adjacent the gear, and a partition is inserted into the passage to prevent contact between the signal transmission medium and the gear. In the embodiment shown in FIG. 1, the gear mechanism is incorporated into an electric power steering (EPS) system used in a motor vehicle (not shown), and the gear housing is a housing 23 for a shaft assembly 22 on which a pinion gear (not shown) for a rack and opinion system is mounted. However, as described herein, alternative embodiments of a gear mechanism in accordance with the present invention can incorporate other types of gears and can be utilized in other types of assemblies, according to the needs of a particular application. The embodiment of the EPS system shown in FIG. 1 also includes a rack gear housing 104, a motor housing 102, and a controller housing 105.

In the embodiment shown in FIG. 1, a first portion 22a of the shaft assembly is operatively coupled to a steering wheel (not shown) of the vehicle, and second portion 22b of the shaft assembly is operatively coupled (via a pinion gear formed thereon, for example) to a steering gear 38 (for example, a rack gear of a known rack and pinion mechanism). The rack gear 38 is operatively coupled to a mechanism (not shown) which turns the vehicle road wheels responsive to a translational movement of the rack gear to achieve the desired steer angle of the vehicle. In a manner known in the art, rotation of shaft assembly second portion 22b about an axis L1 correspondingly rotates the pinion mounted on the shaft assembly, producing a corresponding translational movement of rack gear 38 along axis L2. By this mechanism, the steering force generated when a driver operates the steering wheel is transmitted to the vehicle wheels which are steered through shaft assembly 22 and the rack and pinion steering apparatus.

Bearings 30 and 32 are provided in shaft assembly housing 23 to support rotating shaft assembly second portion 22b. In a particular embodiment, one or both of bearings 30 and 32 is also positioned and secured within shaft assembly housing 23 so as to support a portion of signal transmission medium 100 (described in greater detail below). In this embodiment, the bearing (or bearings) aid in supporting the signal transmission medium so as to prevent contact between the medium and shaft assembly second portion 22b.

Figure 2:
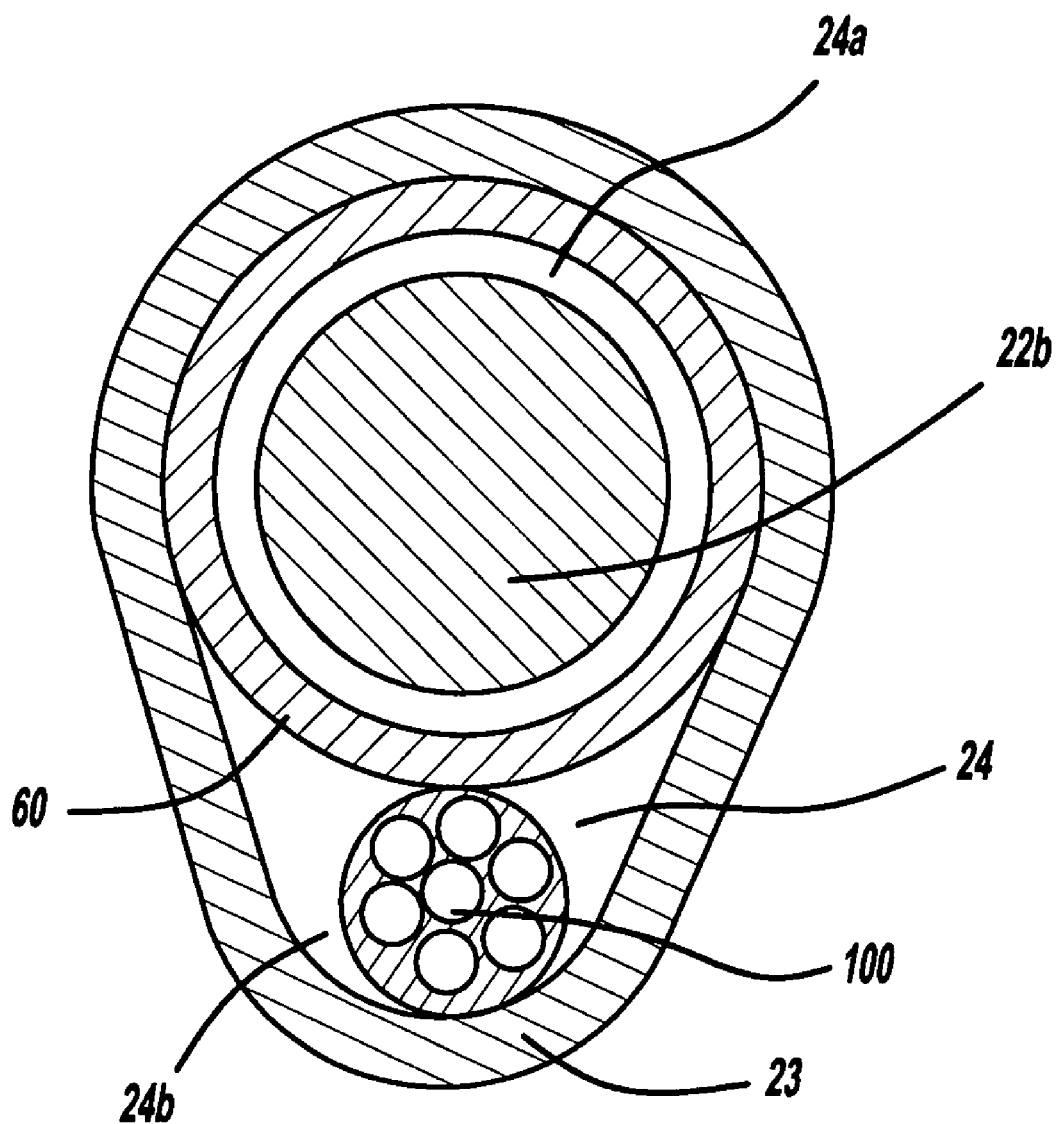
FIG. 2 is a cross-sectional view of a portion of a shaft assembly housing incorporating a partition in accordance with the present invention.

Referring to FIGS. 1 and 2, a passage 24 is formed within shaft housing 23 to accommodate shaft assembly 22 therein. Shaft assembly 22 resides within passage 24 for transferring a driver-applied torque to road wheels (not shown) of the vehicle. Shaft housing passage 24 is configured to enable positioning of signal transmission medium 100 along the passage adjacent shaft portion 22b and/or the pinion gear attached thereto.

In the embodiment shown in FIG. 1, to prevent contact between signal transmission medium 100 and the pinion gear mounted on shaft assembly second portion 22b, a portion of medium 100 is secured to one or more of bearings 30, 32 supporting the shaft assembly. Medium 100 may be secured to the bearing(s) using any suitable method, for example, a bracket or cable ties.

Referring again to FIG. 1, a known torque sensor assembly, generally designated 18, resides within shaft housing 23 and is operatively coupled to shaft assembly 22 for sensing and measuring a driver-applied torque on the shaft assembly. Torque sensor assembly 18 then transmits a signal corresponding to the driver-applied torque to an electronic control unit (ECU) 101. ECU 101 then generates a control signal to a motor (not shown) which is housed in motor housing 102 and which is operatively coupled to a gear assembly (not shown). The gear assembly is, in turn, operatively coupled to rack gear 38 of the rack and pinion mechanism. The gear assembly, via the rack, provides assistance in turning the vehicle road wheels. Examples of torque sensor assemblies that may be incorporated into an EPS system in accordance with the present invention are described in U.S. Pat. No. 6,655,493 and in U.S. Published Application No. 2006/0236784, incorporated herein by reference.

As seen in FIG. 2, to accommodate both signal transmission medium 100 and shaft second portion 22b with its attached pinion gear, a cross-section of the housing passage is provided with a first portion 24a having a relatively larger cross-sectional area, and a second portion 24b with a relatively smaller cross-sectional area. The shaft assembly 22 and its associated pinion gear reside within passage first portion 24a, while signal transmission medium 100 is passed through passage second portion 24b. In the particular embodiment shown in FIG. 2, the cross-section of the shaft housing is in the general shape of a "tear-drop". However, other cross-sectional shapes incorporating portions having both relatively larger and smaller cross-sectional areas are also contemplated. Shaft housing 23 may be formed from aluminum, steel, metal alloys, or other suitable materials by casting, machining, and/or other suitable processes.

Referring again to FIGS. 1 and 2, signal transmission medium 100 extends into and along passage 24 adjacent shaft assembly 22 and its associated pinion gear. Signal transmission medium 100 is configured for conveying signals between torque sensor assembly 18 and controller 101 mounted within controller housing 105. Controller 101 controls a motor (not shown) mounted within motor housing 102 for powering a gear assembly (not shown) which assists in turning the vehicle road wheels. In all of the embodiments discussed herein, signal transmission medium 100 connects controller 101 to torque sensor assembly 18. Medium 100 may be a single jacketed wire, a wire bundle, a cable comprising several wires, a fiber optic line, or any other device suitable for conveying the desired signals between the torque sensor assembly and the controller.

Referring again to FIG. 2, a partition 60 is inserted into shaft housing passage 24 to prevent contact between signal transmission medium 100 and the pinion gear mounted on shaft assembly second portion 22b. When inserted into housing passage 24, the partition essentially separates housing passage first portion 24a from second portion 24b, preventing contact between shaft assembly second portion 22b and transmission medium 100.

In the embodiment shown in FIG. 2, partitioning of housing passage 24 is effected by a shroud or sleeve 60 disposed about at least a portion of either the shaft assembly or the transmission medium. Shroud 60 prevents signal transmission medium 100 from contacting shaft assembly second portion 22b and/or its associated pinion gear, thereby permitting the signal transmission medium to be routed through the gear housing proximate the gear without damage to the signal transmission medium. Shroud 60 may be extruded, roll-formed, or otherwise fabricated from a metal, polymer, or other suitable material. Other structures for separating the pinion gear and the signal transmission medium are also contemplated. In addition, shroud 60 may be used in conjunction with securement of a portion of medium 100 to one or more of bearings 30, 32 (as previously described) to prevent contact between shaft assembly 22 and signal transmission medium 100.

Figure 3:
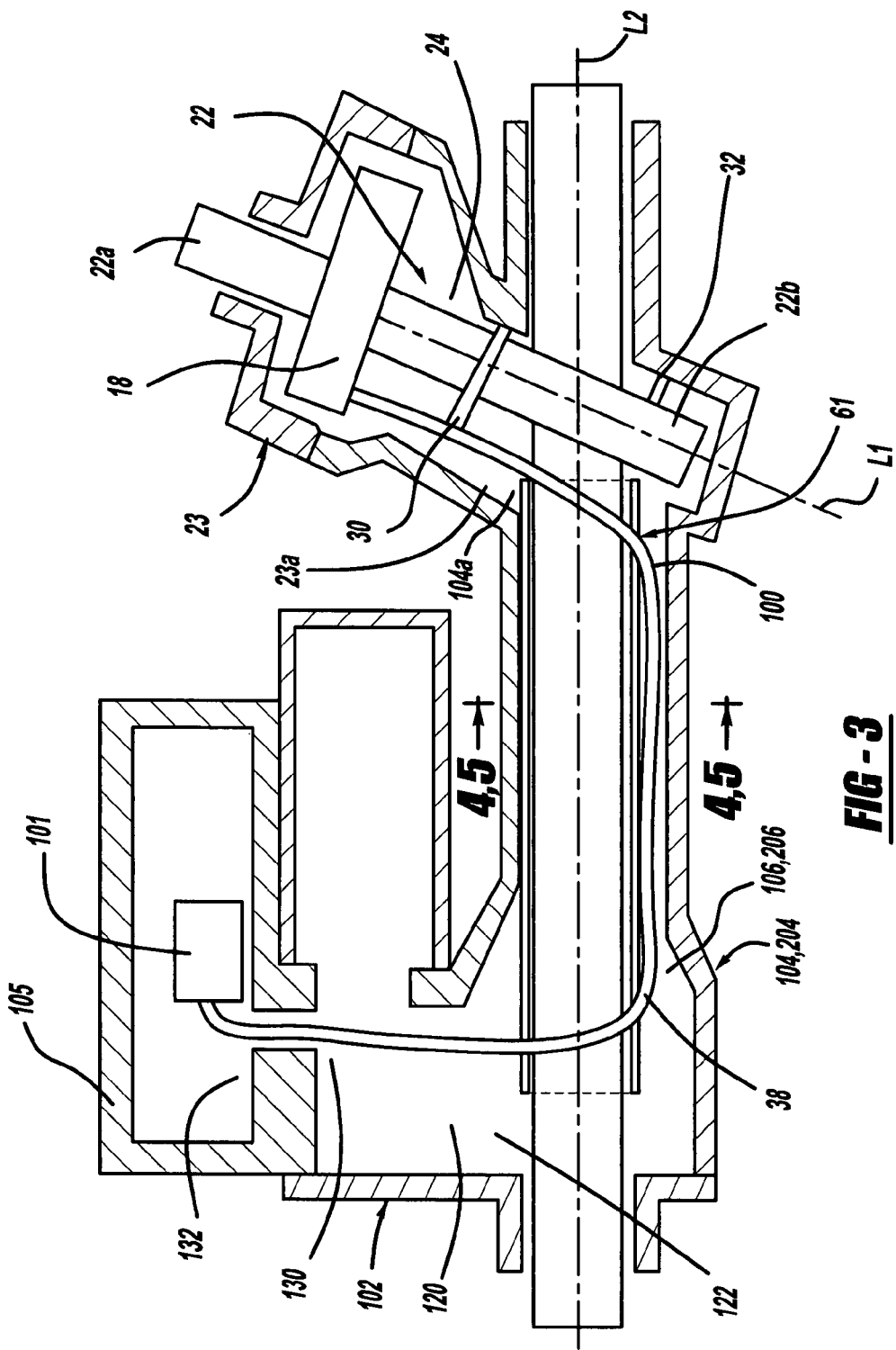
FIG. 3 is a schematic representation of a gear mechanism in accordance with a second embodiment of the present invention.
Figure 4:
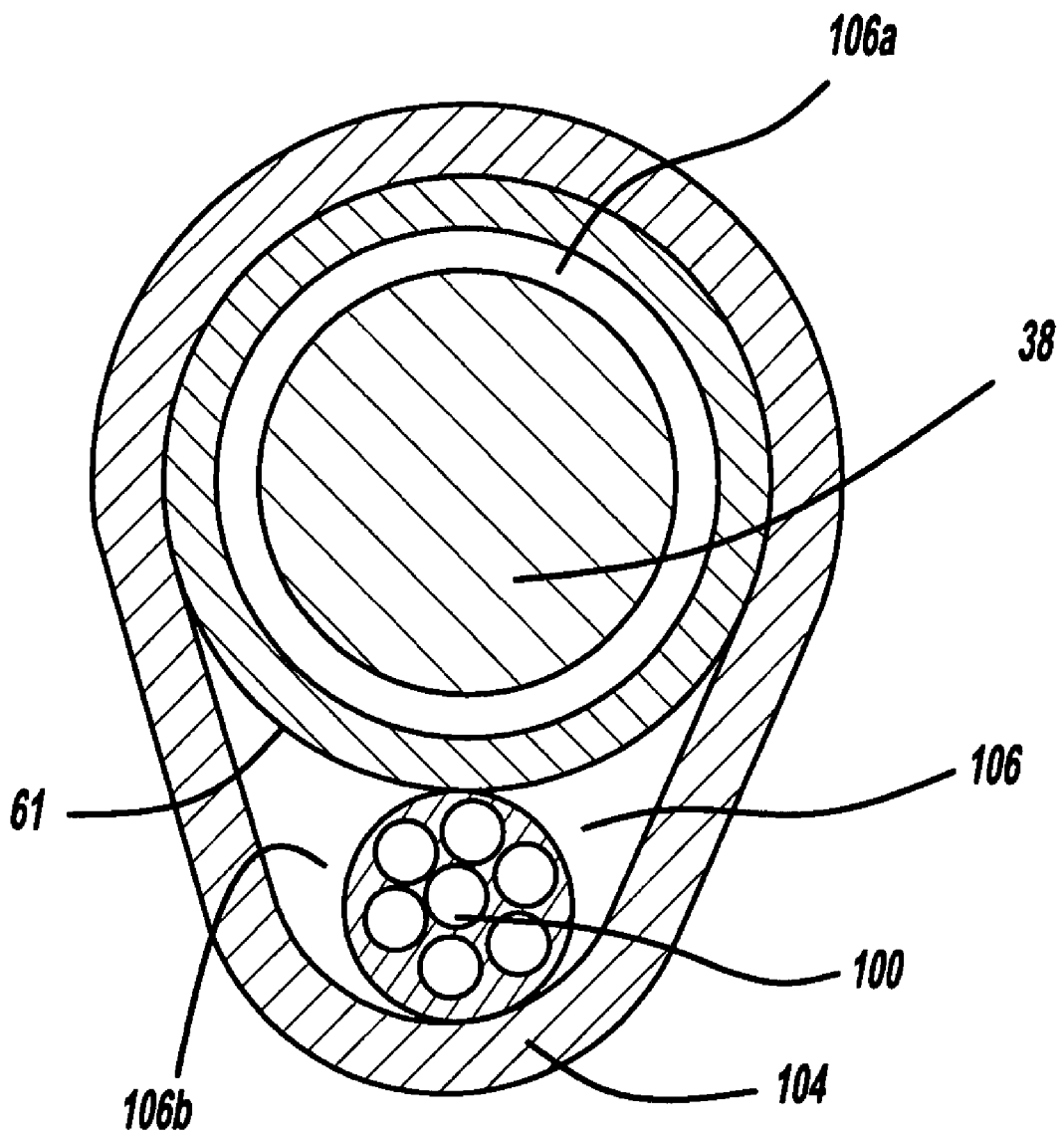
FIG. 4 is a cross-sectional view of a portion of a rack gear housing incorporating a partition in accordance with another embodiment of the present invention.
Figure 5:
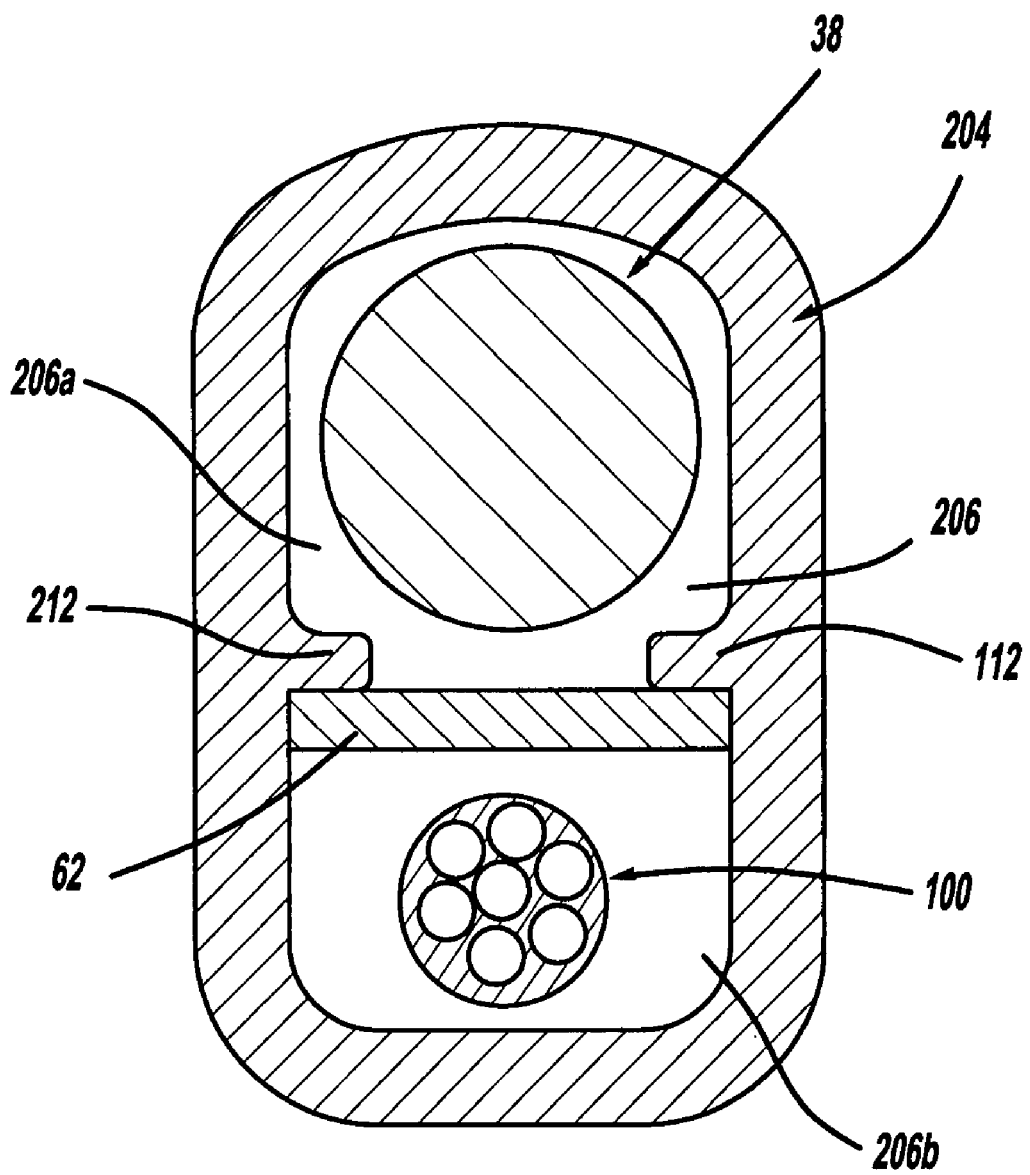
FIG. 5 is a cross-sectional view of a portion of a rack gear housing incorporating a partition in accordance with yet another embodiment of the present invention.

Referring now to FIGS. 3-5, in another embodiment of the present invention, the gear mechanism is incorporated into an electric power steering (EPS) system, and the gear housing is a housing 104 for a rack gear 38 in a rack and opinion system.

Rack gear housing 104 is operatively coupled to shaft assembly housing 23 and houses rack gear 38 of the rack and pinion mechanism such that the rack gear is movable along an axis L2 extending along the gear. A passage 106 is formed within rack housing 104 to accommodate rack gear 38 therein. Shaft assembly housing 23 (or a portion thereof) may be formed integrally with rack housing 104, or the shaft housing (or a portion thereof) may be formed separately from the rack housing and coupled thereto using known methods, including welding or fasteners. In the embodiment shown in FIG. 3, shaft assembly housing 23 and rack housing 104 are formed separately, and an opening 23a is formed in shaft assembly housing 23. Also, a complementary opening 104a is formed in rack gear housing 104. Openings 104a and 23a combine to define a passage enabling communication between the interiors of housings 104 and 23, thus enabling the shaft assembly second portion 22b to engage rack gear 38, and also enabling signal transmission medium 100 to be passed between rack housing 104 and shaft assembly housing 23. Referring to FIGS. 3 and 4, rack housing passage 106 is also configured to enable positioning of signal transmission medium 100 along the passage adjacent rack gear 38. In a first embodiment, to accommodate both signal transmission medium 100 and rack gear 38, a cross-section of rack housing passage 106 is provided with a first portion 106a having a relatively larger cross-sectional area, and a second portion 106b with a relatively smaller cross-sectional area. The rack gear 38 resides within passage first portion 106a, while the signal transmission medium 100 is passed through passage second portion 106b. In the particular embodiment shown in FIG. 4, the cross-section of the rack housing is in the general shape of a "tear-drop". However, other shapes incorporating portions having both relatively larger and smaller cross-sectional areas are also contemplated. Rack housing 104 may be formed from aluminum, steel, metal alloys, or other suitable materials by casting, machining, and/or other suitable processes.

Referring again to FIG. 4, a partition is inserted into passage 106 to prevent contact between signal transmission medium 100 and rack gear 38. When inserted into the housing passage, the partition essentially separates rack housing passage first portion 106a from second portion 106b, preventing contact between rack gear 38 and signal transmission medium 100. In the embodiment shown in FIG. 4, partitioning of rack housing passage 106 is effected by an enclosure disposed about at least a portion of the rack gear. In a particular embodiment, the enclosure is in the form of an annular tube or sleeve 61. Sleeve 61 prevents signal transmission medium 100 from contacting rack gear 38, thereby permitting the signal transmission medium to be routed through rack gear housing 104 proximate the rack gear without damage to the signal transmission medium. Sleeve 61 may be extruded, roll-formed, or otherwise suitable fabricated from a metal, polymer, or other suitable material. Other structures for separating the rack gear and the signal transmission medium are also contemplated. For example, a channel or bracket (not shown) having any of a variety of cross-sectional shapes could be positioned to at least partially enclose at least a portion of the rack gear so as to isolate the rack gear from the signal transmission medium.

Referring to FIGS. 1 & 5, in a second embodiment, a cross-section of rack housing 204 is formed so as to have at least a pair of ribs 112 formed along passage 206, with each rib 112 extending from an associated housing wall into housing passage 106. In the embodiment shown, the partition is a wall 62 inserted into passage 206 to abut each of ribs 112, thereby forming a barrier separating rack gear 38 from signal transmission medium 100. Ribs 112 and wall 62 may be dimensioned so as to prevent disengagement of the wall from the ribs and re-orientation of the wall within housing passage 206. Alternatively, a filler material (not shown) may be positioned between portions of medium 100, the walls of rack housing 104, and wall 62 to occupy space between medium 100 and wall 62. This aids in preventing re-orientation of wall 62 while also permitting signal transmission media of various sizes to be accommodated within a single size of passage 206. Re-orientation of the wall within the housing passage may permit signal transmission medium 100 to enter housing passage first portion 206a and contact the rack gear, possibly damaging the signal transmission medium. Wall 62 may be secured in position within rack housing passage 206 using, for example, an interference fit or an adhesive applied at one or more points along a contact interface between the wall and the housing. Alternatively, the signal transmission medium may abut wall 62 and urge the wall against ribs 112 (as shown in FIG. 5) so as to prevent disengagement of wall 62 from abutting contact with the ribs.

Referring again to FIGS. 1 and 3, motor housing 102 is coupled to rack housing 104 and houses a motor (not shown) operatively coupled to a gear assembly (not shown) which produces lateral movement of rack gear 38 responsive from a signal from ECU 101. As stated previously, the motor gear assembly, via the rack, provides assistance in turning the vehicle road wheels to achieve a desired vehicle steering angle. Motor housing 12 (or a portion thereof) may be formed integrally with rack housing 104, or the motor housing (or a portion thereof) may be formed separately from the rack housing and coupled thereto using known methods, including welding or fasteners. In the embodiments shown in FIGS. 1 and 3, motor housing 102 and rack housing 104 are formed separately, and an opening 120 is formed in motor housing 102. Also a complementary opening 122 is formed in rack gear housing 104. Openings 120 and 122 combine to define a passage enabling communication between the interiors of housings 102 and 104, thereby enabling signal transmission medium 100 to be passed between rack housing 104 and motor housing 102. Motor housing 102 may be formed from aluminum, steel, or other suitable materials by casting, machining, and/or other suitable processes.

Referring again to FIGS. 1 and 3, electronic controller housing 105 is coupled to motor housing 102 and houses ECU 101 configured to receive signals from torque sensor assembly 18 (via signal transmission medium 100), and to generate and transmit a control signal to the motor mounted in motor housing 102. Controller housing 105 (or a portion thereof) may be formed integrally with motor housing 102, or the controller housing (or a portion thereof) may be formed separately from the motor housing and coupled thereto using suitable methods, for example welding or fasteners. In the embodiments shown in FIGS. 1 and 3, motor housing 102 and controller housing 105 are formed separately. An opening 130 is formed in motor housing 102, and a complementary opening 132 is formed in controller housing 105. Openings 130 and 132 combine to define a passage enabling communication between the interiors of housings 102 and 105, thereby enabling signal transmission medium 100 to be passed between controller housing 105 and motor housing 102. Controller housing 105 may be formed from aluminum, steel, or other suitable materials by casting, machining, and/or other suitable processes.

It may be seen that the embodiments of the wire routing structure described herein provide several important advantages over previous designs.

The wire routing structure embodiments described pass the signal transmission medium through the interiors of the various housings containing the elements of the EPS. This routing scheme obviates the need for sealed connectors in connecting the torque sensor assembly to the ECU, thereby reducing the cost and complexity of the EPS assembly.

In addition, use of the partition(s) described herein effectively isolates the signal medium from the gears enclosed in the housings. This enables the medium to be routed through the housing interiors without contacting the gears and being caught in pinch points between the gears, which could result in damage or breakage of the signal medium. Use of the partition(s) can accomplish this separation of the signal medium from the gears without building in additional walls or compartments into the housings, thereby saving the expense that would be required to add cavity slides to the tools used to fabricate the housings.

Also, referring again to FIG. 1, shaft assembly housing bearing 32 which supports shaft second portion 22b may be employed as an axial restraint feature, to prevent axial movement of rack partition 61 into the region where the pinion gear meshes with rack gear 38.

Although the principles of the present invention are described herein as applicable to a signal transmission medium passing through a housing enclosing a gear or gear assembly in an electric power steering system, the principles described herein can be applied to other applications where it is necessary to isolate a signal transmission medium passing through a structure in order to prevent damage to the medium.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gear mechanism comprising:
   a gear housing including a passage formed therein;
   a gear positioned in the passage;
   a signal transmission medium positioned in the passage, the signal transmission medium being spaced apart from the gear along a plane extending through the gear and substantially perpendicular to a rotational axis of the gear; and
   a partition inserted into the passage to prevent contact between the signal transmission medium and the gear, the partition dividing the passage into a first portion in which the gear resides, and a second portion adjacent the first portion through which the signal transmission medium is routed, wherein the partition comprises an enclosure disposed about at least a portion of the gear.

2. The gear mechanism of claim 1 wherein the enclosure comprises a tube.

3. The gear mechanism of claim 1 wherein the housing includes at least a pair of ribs, each rib extending from a housing wall associated therewith into the passage, and wherein the partition engages each of the ribs.

4. The gear mechanism of claim 1 wherein a cross-section of the housing has a first portion with a relatively larger cross-sectional area, and a second portion with a relatively smaller cross-sectional area, and wherein the signal transmission medium is passed through the second portion.

5. The gear mechanism of claim 4 wherein the housing cross-section has a tear-drop shape.

6. The gear mechanism of claim 1 wherein the gear housing is a housing for a rack gear of a rack and pinion gear mechanism.

7. The gear mechanism of claim 1 wherein the gear housing is a housing for a shaft assembly incorporating a pinion gear.

8. The gear mechanism of claim 6 further including a shaft assembly incorporating a pinion gear and a bearing for supporting the shaft assembly within the housing, and wherein a portion of the signal transmission medium is supported by the bearing.

9. The gear mechanism of claim 1 wherein a second housing is coupled to the gear housing such that a passage between the second housing and the gear housing is formed to enable a signal transmission medium to extend between the gear housing and the second housing.

10. The gear mechanism of claim 9 wherein the second housing is a housing for a shaft assembly incorporating a pinion gear.

11. The gear mechanism of claim 9 wherein the second housing is a housing for a rack gear of a rack and pinion gear mechanism.

12. The gear mechanism of claim 9 wherein the second housing is a housing for a motor.

13. The gear mechanism of claim 9 wherein a third housing is operatively coupled to the second housing such that a passage is formed between the second housing and the third housing to enable the signal transmission medium to extend between the second housing and the third housing.

14. The gear mechanism of claim 13 wherein the third housing is a housing for an electronic controller.

15. The gear mechanism of claim 9 wherein a third housing is operatively coupled to the gear housing such that a passage is formed between the gear housing and the third housing to enable the signal transmission medium to extend between the gear housing and the third housing.

16. The gear mechanism of claim 15 wherein the third housing is a housing for a motor.

17. The gear mechanism of claim 15 wherein the third housing is a housing for a shaft assembly incorporating a pinion gear.

18. The gear mechanism of claim 15 wherein a fourth housing is operatively coupled to the third housing such that a passage between the third housing and the fourth housing is formed to enable the signal transmission medium to extend between the third housing and the fourth housing.

19. An electric power steering system including a gear mechanism in accordance with claim 1.

20. A gear housing including a passage adapted for receiving therein:
   a gear;
   a signal transmission medium spaced apart from the gear along a plane extending through the gear and substantially perpendicular to a rotational axis of the gear; and
   a partition inserted into the passage to prevent contact between the signal transmission medium and the gear; the partition dividing the passage into a first portion in which the gear resides, and a second portion adjacent the first portion through which the signal transmission medium is routed, wherein the partition comprises an enclosure disposed about at least a portion of the gear.

21. A vehicle comprising an electric power steering system including a gear mechanism in accordance with claim 1.

22. A mechanism comprising:
   a gear housing including a passage formed therein;
   a gear positioned in the passage, the gear having a rotational axis and a radially outermost portion located at a radial distance from the axis;
   a signal transmission medium positioned radially exteriorly and not radially interiorly of the radially outermost portion of the gear; and
   a partition positioned radially exteriorly and not radially interiorly of the radially outermost gear portion between the gear and the signal transmission medium to prevent contact between the signal transmission medium and the gear, the partition dividing the passage into a first portion in which the gear resides, and a second portion adjacent the first portion through which the signal transmission medium is routed, wherein the first portion and the second portion are separately enclosed portions and wherein the partition comprises an enclosure disposed about at least a portion of the gear.

23. The gear mechanism of claim 1, wherein the partition is a single axially extending partition wall.

24. The gear mechanism of claim 1, wherein the first portion and the second portion of the passage are separately enclosed portions.

* * * * *